United States Patent Office 3,463,300
Patented Aug. 26, 1969

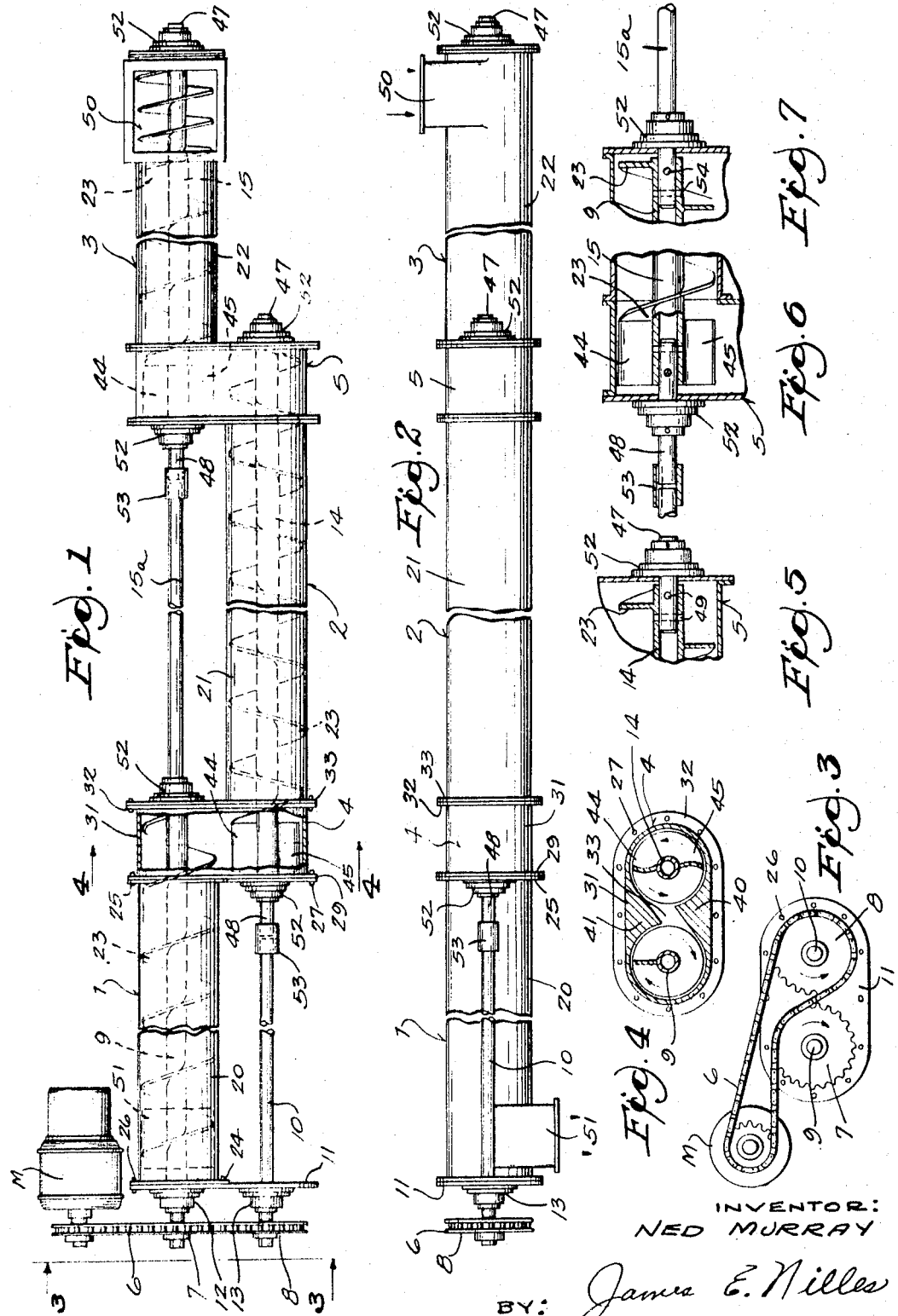

3,463,300
SCREW CONVEYOR
Ned Murray, 1116 E. Royalton St.,
Waupaca, Wis. 54981
Filed July 20, 1967, Ser. No. 654,824
Int. Cl. B65g 33/32, 33/14, 33/34
U.S. Cl. 198—213     4 Claims

ABSTRACT OF THE DISCLOSURE

A helical screw conveyor which may be of many feet in length, for example 100 feet, which has no internal bearings but only externally mounted bearings. The conveyor is made up in sections of alternately opposite rotation and offset axially from one another. Cross-over sections connect the oppositely rotating sections together and efficiently transfer the material from one section to the next and permit the use of external bearings only.

BACKGROUND OF THE INVENTION

Field of the invention

The present invention pertains generally to material conveying equipment of the type having a helical screw or auger rotatably mounted in and enclosed by a housing such as a pipe, or U-shaped trough. Such conveyors find utility in foundries, steel mills, feed plants, the food industry or other industries where granular or similar material must be conveyed for long distances, either in the horizontal, vertical or other directions.

Prior art

The prior art conveyors of this type usually used internal bearings for rotatably supporting the auger or screw, which bearings were subjected to abrasion and wear and were difficult to keep clean. These internal bearings, in addition to short life due to wear and being objectionable because of sanitary requirements, were also objectionable because they resulted in "dead" space or gap in positively moving the material through the conveyor.

SUMMARY OF THE INVENTION

The present invention provides a screw type conveyor which may be many feet in length and requires no internal bearings. The conveyor is made up of straight sections which are connected together by cross-over sections. The lengths of straight sections are offset axially from one another and the helical screws of alternate sections rotate in opposite directions. The cross-over sections contain the external bearings in which the screws are rotatably mounted, and these cross-over sections are specially designed to result in efficient transfer of the material from the one screw to the next with minimum residue or repeating. Furthermore, these cross-over sections are so designed that each can be used to transfer material from a righthand to a lefthand screw or alternatively, from a lefthand to a righthand screw. With this arrangement, it is possible to use screw conveyors of any length without the use of internal bearings.

A more specific aspect of the invention relates to the drive means for the various sections of screw conveyors, and which drive means requires only two drive shafts, regardless of the number of separate lengths of conveyor sections utilized.

BRIEF DESCRIPTION OF THE DRAWINGS

FIGURE 1 is a plan view of a conveyor made in accordance with the present invention, certain parts being shown as broken away or removed for clarity in the drawings;

FIGURE 2 is a side view of the conveyor shown in FIGURE 1;

FIGURE 3 is an end view of the device as shown in FIGURE 1, the view being taken along line 3—3 in FIGURE 1;

FIGURE 4 is a transverse sectional view through a cross-over section and taken generally along 4—4 in FIGURE 1;

FIGURE 5 is a fragmentary, detail, enlarged view of one end of one of the straight sections;

FIGURE 6 is a fragmentary, detail, enlarged view of the other end of one of the straight sections; and FIGURE 7 is a fragmentary, detail, enlarged view of the end of another section where it connects to an external shaft.

DESCRIPTION OF A PREFERRED EMBODIMENT

The entire screw conveyor may be made up of any number of straight sections, and as shown in FIGURE 1 comprises straight sections 1, 2 and 3 which are connected together by the cross-over sections 4 and 5. A single source of power, such as an electric motor, M, through an endless flexible member, such as roller chain 6, drives the sprockets 7 and 8, which are fixed to internal shaft 9 of section 1 and the external shaft 10, respectively. A plate 11 is secured to the end of section 1 and extends therefrom to support the external bearings 12 and 13 for shaft 9 and 10, respectively. The shaft 15 of section 3 is driven from shaft 9 of section 1 through the connecting external shaft 15a which is fastened to shaft 15 by a suitable sleeve coupling, as will more fully appear.

The straight sections include a housing, such as pipes 20, 21 and 22, which enclose and closely fit around the periphery of a helical screw 23 rotatably mounted therein. Each of the helical screws 23 is fixed on its respective shaft 9, 14 and 15 in sections 1, 2 and 3, respectively.

A mounting flange is welded to each end of the housings for being detachably connected to an adjoining flange. For example, the flange 24 of pipe 20 is abutted against the large mounting plate 11 and fixed thereto by bolt means 26. At the other end of section 1, a flange 25 is secured as by welding to the pipe 20 and is detachably mounted by bolt means 27 to a flange 29 of the cross-over section 4.

The cross-over sections 4 and 5 are identical and can be reversed for feeding from left to righthand rotation of the screws, or vice versa, by turning the cross-over section end for end. The cross-over section 4 includes a housing 31, the previously mentioned flange 29, and an opposite flange 32 similar to flange 29. Flanges 29 and 32 are welded to the housing 31, the latter of which is elongated in cross-section, is shown best in FIGURES 3 and 4, so as to be secured by bolt means to the flange 25 of conveyor section 1 and a flange 33 of section 2. The other straight sections 1, 2 and 3 and cross-over section 5 are similarly constructed and secured together, as previously indicated, and any number of these sections may be joined together as required.

It will be noted that sections 1 and 3 contain screws of a lead opposite to screw in section 2, that is to say, they are pitched in the opposite direction from the screw in section 2. The central housing 31 of the cross-over sections 4 and 5 has internal, cut-off portions 40 and 41 extending thereacross and which protrude toward one another generally so as to form a throat or restricted passage 33 (FIGURE 4) to restrict the flow of material in the housing 31 to a definite path as it crosses over from one section to the next. A pair of curved paddles 44, 45 are fixed on the end of each shaft 14 and 15 and are located in their respective cross-over section. These paddles rotate as shown in FIGURE 4 and positively move the material through the passage 33 and to the subsequent conveyor section. These paddles or flingers are curved so as to form a generally S shape in cross-section (FIGURE 4) and force material through the restricted passage 33.

As the material is forced through the opening 33, the portion 40 which extends toward the center of the housing acts to cut off the material and insure that no appreciable carry-over of material occurs, and instead the material is definitely transferred from one section to the other.

Section 3 has an inlet hopper 20, while section 1 has an outlet hopper 51, but other forms or numbers of hoppers may be used.

An external shaft 15a transmits power from the shaft 9 of section 1 to the shaft 15 of the section 3. External shaft 10 transmits power to internal shaft 14. It is necessary only to have two rows of shafts regardless of the number of sections attached to the total conveyor.

The shafts 14 and 15 are tubular and have stub shafts 47, 48 fixed in their ends by pins 49. Shafts 47 and 48 are journalled in the anti-friction, external bearings 52, which are secured to the outside of the cross-over sections 4 and 5. Stub shafts 47 (FIGURE 5) are located at one end of tubular shafts 14 and 15, while stub shafts 48 are fixed to the other end of shafts 14 and 15 and extend from the cross-over sections. Stub shafts 48 are also connected by sleeve couplings 53 to solid external shafts 10 and 15a.

As shown in FIGURE 7, shaft 15a is then journalled bearing 52 in section 4 and is connected to shaft 9 by a pin 54.

It will be noted that the anti-friction bearings 12, 13 and 52 are all externally mounted and there is no hesitation in the flow of material through the conveyor. Cross-over sections 4 and 5 are identical and interchangeable. The conveyor can be readily changed in length by the addition of straight and cross-over sections.

I claim:

1. A screw conveyor comprising, a plurality of straight sections for feeding material successively therethrough, adjacent straight sections being axially offset from one another, a cross-over section connecting adjacent straight sections together for conveying material therebetween, each of said straight sections including an elongated housing and a helical screw member rotatably mounted therein for moving material along the inside of said housings, the screw members of adjacent straight sections rotatable in opposite directions; said cross-over section including a housing rigidly fastened to adjacent straight section housings and in material receiving communication therewith, the adjacent ends of said screw members being located in said cross-over section, the end of the screw member which feeds into said cross-over section having paddle means thereon for positively moving material transversely through said cross-over section and to said next adjacent screw member, said cross-over section having internal and oppositely facing cut off portions along the axial length of said cross-over section and which portions extend transversely of said screw members and toward one another to define a transversely restricted passage through which said material is pushed by said paddle means whereby repeat rotation of material is prevented in said cross-over section, and bearing means on the outside of said sections for rotatably supporting said screw members.

2. The conveyor of claim 1 including drive means at one end of said conveyor and connected to the screw member of one straight section, an external shaft connecting said drive means to the screw member of the next adjacent, axially offset straight section, and a second external shaft connecting the screw members of axially aligned straight sections together.

3. The conveyor of claim 1 including drive means at one end of said conveyor and connected to the screw member of one straight section, an external shaft connecting said drive means to the screw member of the next adjacent, axially offset straight section, and a second external shaft connecting the screw members of axially aligned straight sections together.

4. The conveyor as defined in claim 2 further characterized in that said straight sections and said cross-over section have end flanges by which they are secured together.

References Cited

UNITED STATES PATENTS

| 1,703,465 | 2/1929 | Woodhead | 198—213 |
| 1,867,245 | 7/1912 | Bailey | 198—213 |
| 2,279,201 | 4/1942 | Kozak | 198—213 |
| 2,845,167 | 7/1958 | Heiken | 198—213 |

FOREIGN PATENTS

| 147,341 | 7/1920 | Great Britain. |

RICHARD E. AEGERTER, Primary Examiner